(12) United States Patent
Deutsch et al.

(10) Patent No.: US 6,467,939 B2
(45) Date of Patent: Oct. 22, 2002

(54) LIGHT FOR VEHICLE WHEELS

(75) Inventors: Daniel J. Deutsch; Jason M. Barber; Russell R. Rothan, all of Orlando, FL (US)

(73) Assignee: Theory 3, Inc., Lake Buena Vista, FL (US)

(*) Notice: Subject to any disclaimer, the term of this patent is extended or adjusted under 35 U.S.C. 154(b) by 58 days.

(21) Appl. No.: 09/756,458

(22) Filed: Jan. 9, 2001

(65) Prior Publication Data

US 2002/0089858 A1 Jul. 11, 2002

(51) Int. Cl.[7] ............................................ F21W 101/02
(52) U.S. Cl. ................................ 362/500; 362/802
(58) Field of Search ............................... 362/802, 500, 362/205; 73/146

(56) References Cited

U.S. PATENT DOCUMENTS

| | | | |
|---|---|---|---|
| 2,708,712 A | * 5/1955 | Jamieson | 362/500 X |
| 4,176,390 A | 11/1979 | Galbert | 362/72 |
| 4,289,376 A | 9/1981 | Vukadinovic | 350/99 |
| 4,800,469 A | 1/1989 | Leon | 362/72 |
| 4,847,735 A | 7/1989 | Kawasaki | 362/72 |
| 4,928,212 A | 5/1990 | Benavides | 362/61 |
| 4,945,337 A | 7/1990 | Huang | 340/442 |
| 5,025,244 A | 6/1991 | Huang | 340/442 |
| 5,278,732 A | 1/1994 | Frankum | 362/72 |
| 5,283,547 A | 2/1994 | Leon | 362/72 |
| 5,333,101 A | 7/1994 | McEvoy | 362/72 |
| 5,357,238 A | 10/1994 | Terada | 362/425.5 |
| 5,550,721 A | 8/1996 | Rapisarda | 362/205 |
| 5,624,175 A | 4/1997 | Gelormino et al. | 362/72 |
| 5,803,574 A | 9/1998 | Szaniszlo | 362/32 |
| 5,839,814 A | 11/1998 | Roberts | 362/78 |
| 5,856,727 A | 1/1999 | Schroeder et al. | 315/55 |
| 5,876,108 A | 3/1999 | Chien | 362/35 |
| 6,070,997 A | * 6/2000 | Duke et al. | 362/500 |

* cited by examiner

Primary Examiner—Laura K. Tso
(74) Attorney, Agent, or Firm—Allen, Dyer, Doppelt, Milbrath & Gilchrist, P.A.

(57) ABSTRACT

An apparatus and method for a motion activated wheel light for a vehicle wheel having an air valve stem. A housing connects the light to the wheel's air valve stem. A power source is positioned within the housing for energizing a light source. A switch is connected to the power source and to the light source so as to energize the light source responsive to rotational motion of the wheel. The housing comprises a material which allows light from the light source to shine through so that it may be seen by a person observing the moving vehicle. The wheel light may comprise a shape for forming a visually perceptible light image when the light source is energized by the motion of the vehicle wheel.

32 Claims, 7 Drawing Sheets

LIGHT FOR VEHICLE WHEELS

FIELD OF THE INVENTION

The present invention relates to the field of accessory lights for vehicles and, more particularly, to a motion activated wheel light for vehicle wheels.

BACKGROUND OF THE INVENTION

Accessory lights of various kinds have become popular for enhancing the appearance of a vehicle. Some such accessory lights may additionally provide added visibility to the vehicle in low light conditions, thereby aiding to increase safety.

Colored lights for lighting the undercarriage of a motor vehicle have also become popular, particularly with younger drivers. Similarly, other known accessory lights for vehicles may be connected to a vehicle wheel for producing a lighting effect on the wheel. Some of these lights, for example, may be suitable for mounting onto wheels on bicycles, motorcycles, automobiles and other motor vehicles.

Accessory lights for mounting on vehicle wheels have been known. Some wheel lights mount onto the spokes of a bicycle wheel. Some lights mount onto the air valve stem of a wheel, but are only reflectors not producing emitted light, or require that they be manually switched on and off. Yet other similar lights for mounting on a tire's air valve stem are energized on contact with the valve stem and remain energized for as long as the battery lasts.

The present invention advantageously provides an automatic wheel light for connecting onto the wheel's air valve stem. The wheel light energizes responsive to the rotational movement of the wheel, so that the light is off when the vehicle is standing still and turns on when the vehicle is moving. Such operation provides for extended battery life, and avoids the inconvenience of having to manually turn the wheel light on and off. In addition, the wheel light is inexpensive to manufacture and is useful for enhancing the appearance and visibility of the moving vehicle.

SUMMARY OF THE INVENTION

With the foregoing in mind, the present invention advantageously provides a motion activated wheel light for a vehicle wheel having an air valve stem. The light comprises a housing for connecting the light to the air valve stem; a power source positioned within the housing; a light source positioned within the housing and connected to the power source; and a switch positioned within the housing and connected to the power source and to the light source so as to energize the light source responsive to motion of the wheel.

The housing provides an enclosure for protecting the other components of the wheel light and, preferably, also serves to connect the wheel light to the wheel. The housing comprises a material which allows light emitted by the light source to shine through so that it may be seen by a person observing the moving vehicle.

The switch is motion activated, and is responsive to a centrifugal force generated when the vehicle wheel rotates. The light source is energized when the switch is activated, thereby lighting the vehicle wheel.

The wheel light may comprise a shape for forming a visually perceptible light image when the light source is energized by the motion of the vehicle wheel.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation when used indicates similar elements in alternative embodiments.

Figure 1:
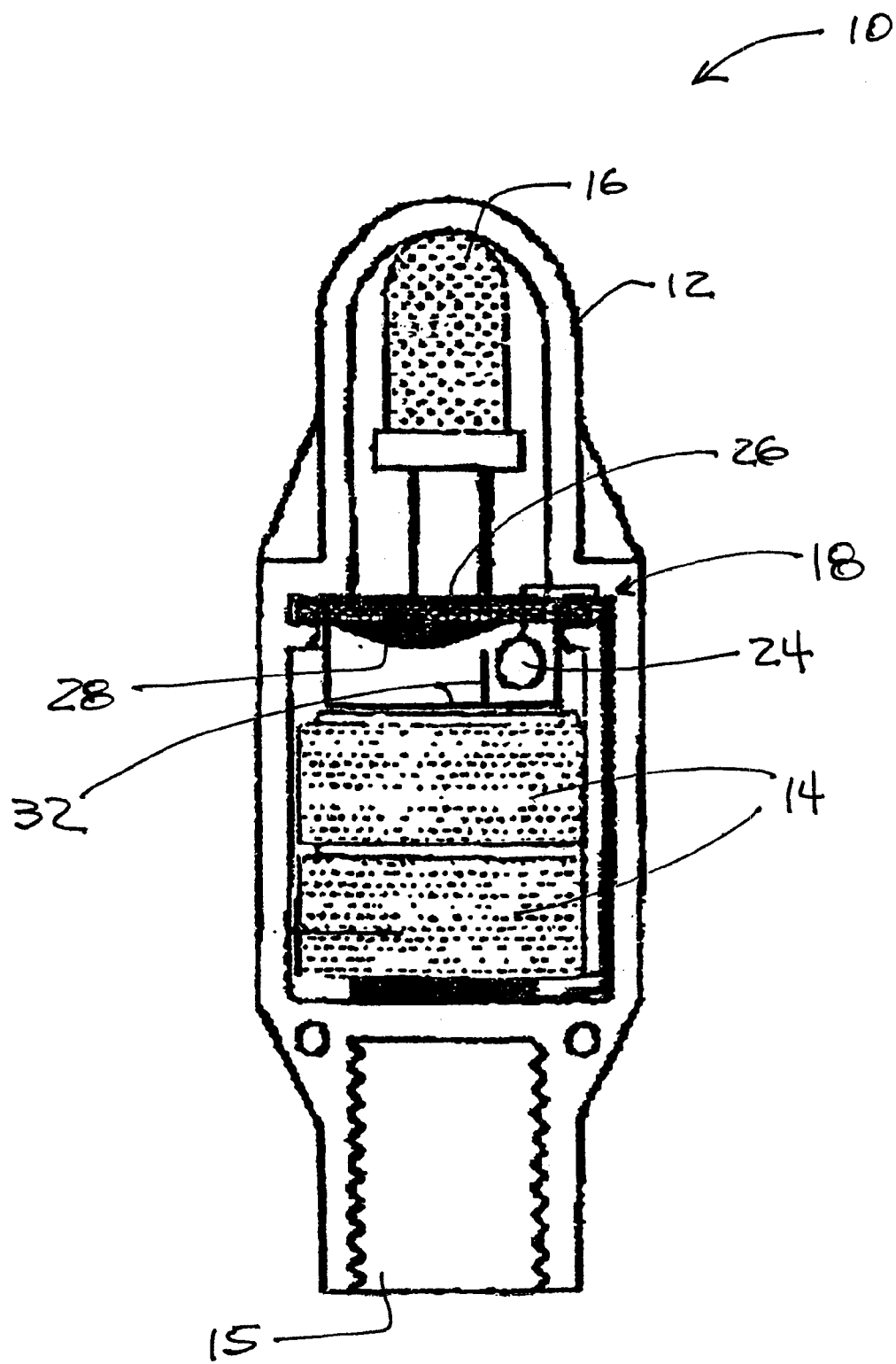
FIG. 1 is a cross section view showing the wheel light according to a preferred embodiment of the present invention.
Figure 2:
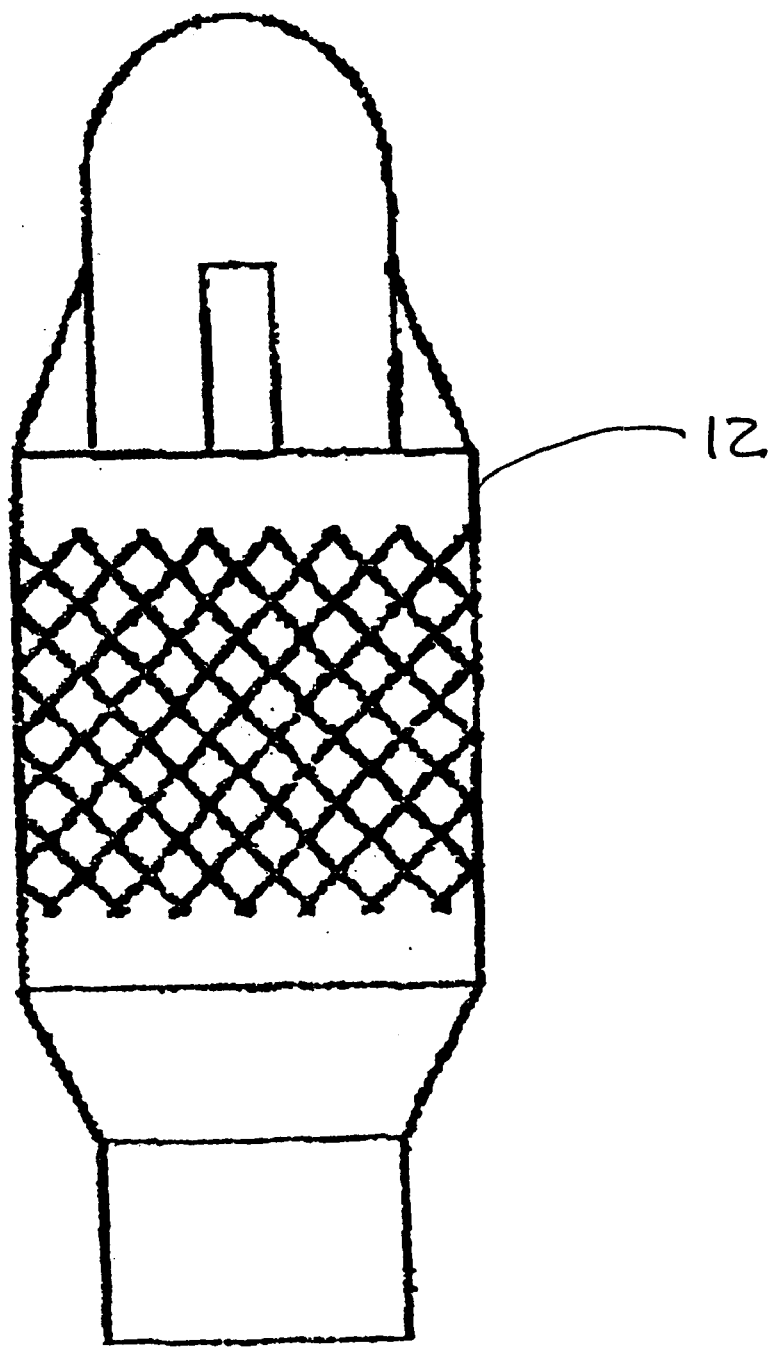
FIG. 2 is a side elevation of the wheel light shown in FIG. 1.
Figure 3:
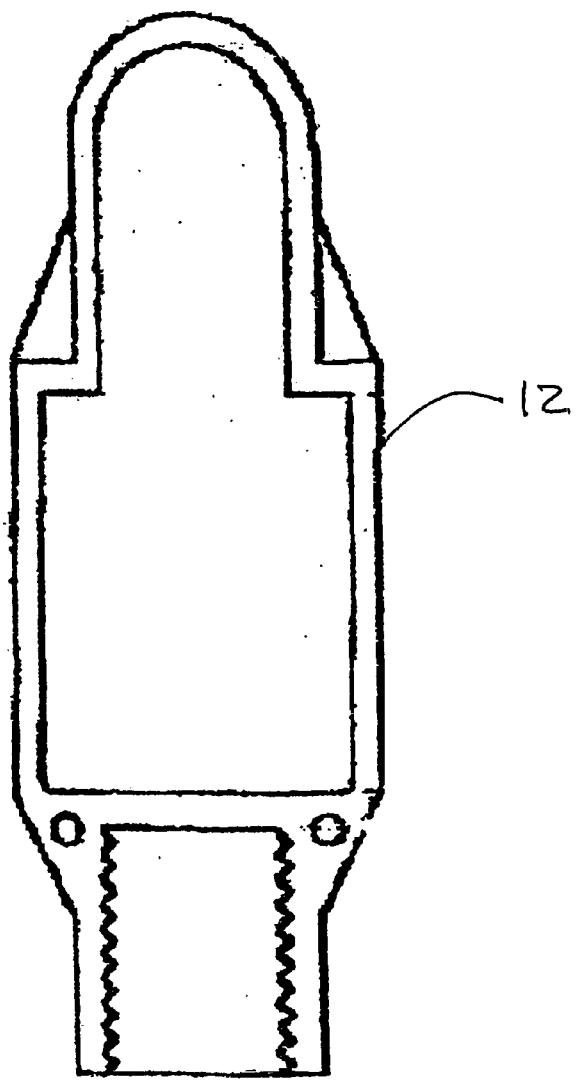
FIG. 3 is a cross section view of the housing of the wheel light of FIG. 1.
Figure 3:
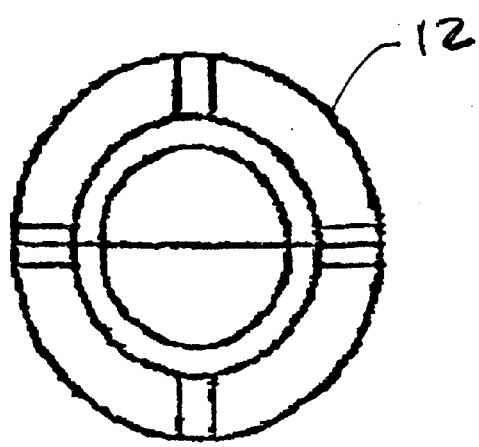
Figure 4:
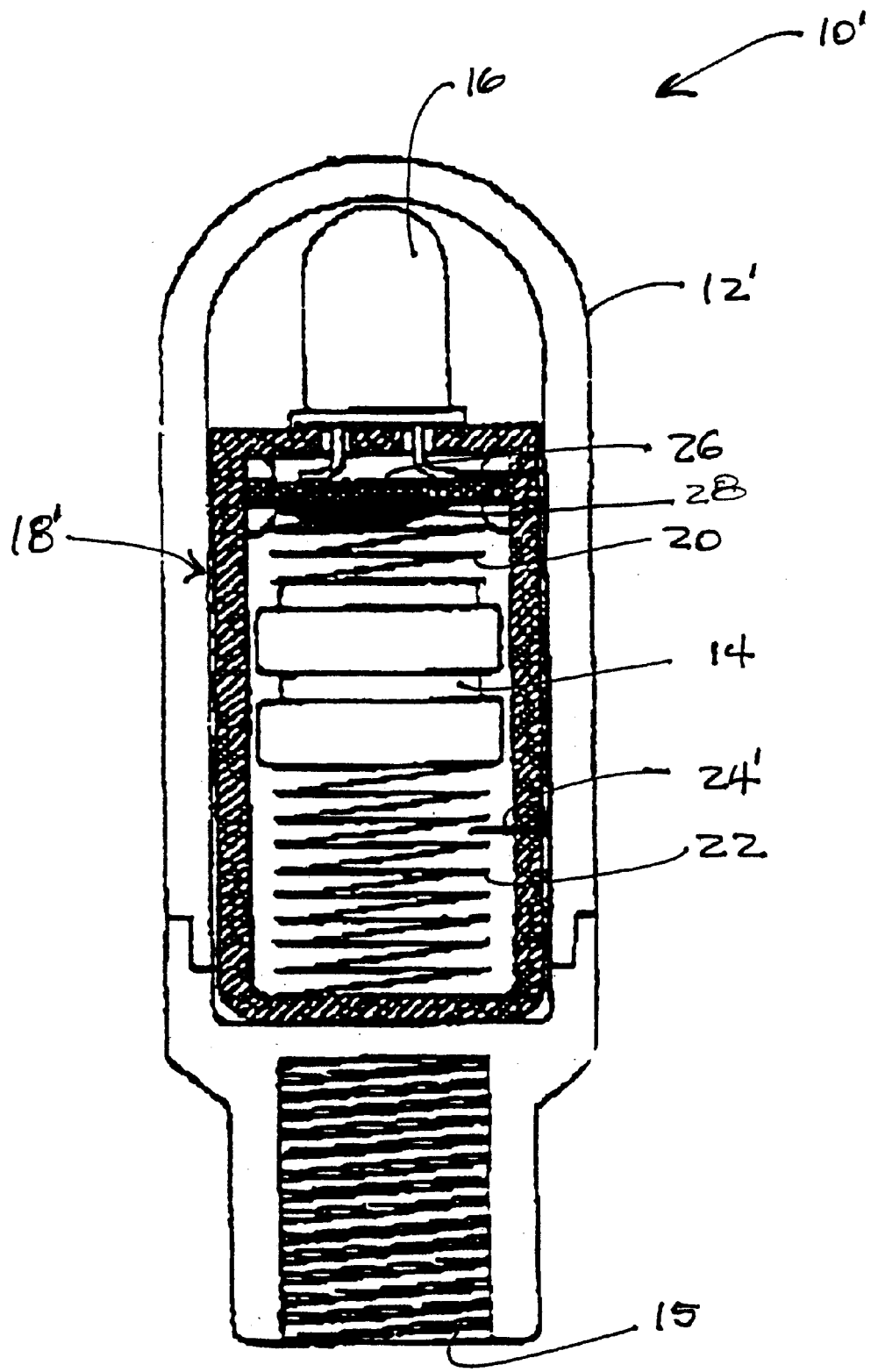
FIG. 4 is a cross section view of an additional embodiment of the invention.
Figure 5:
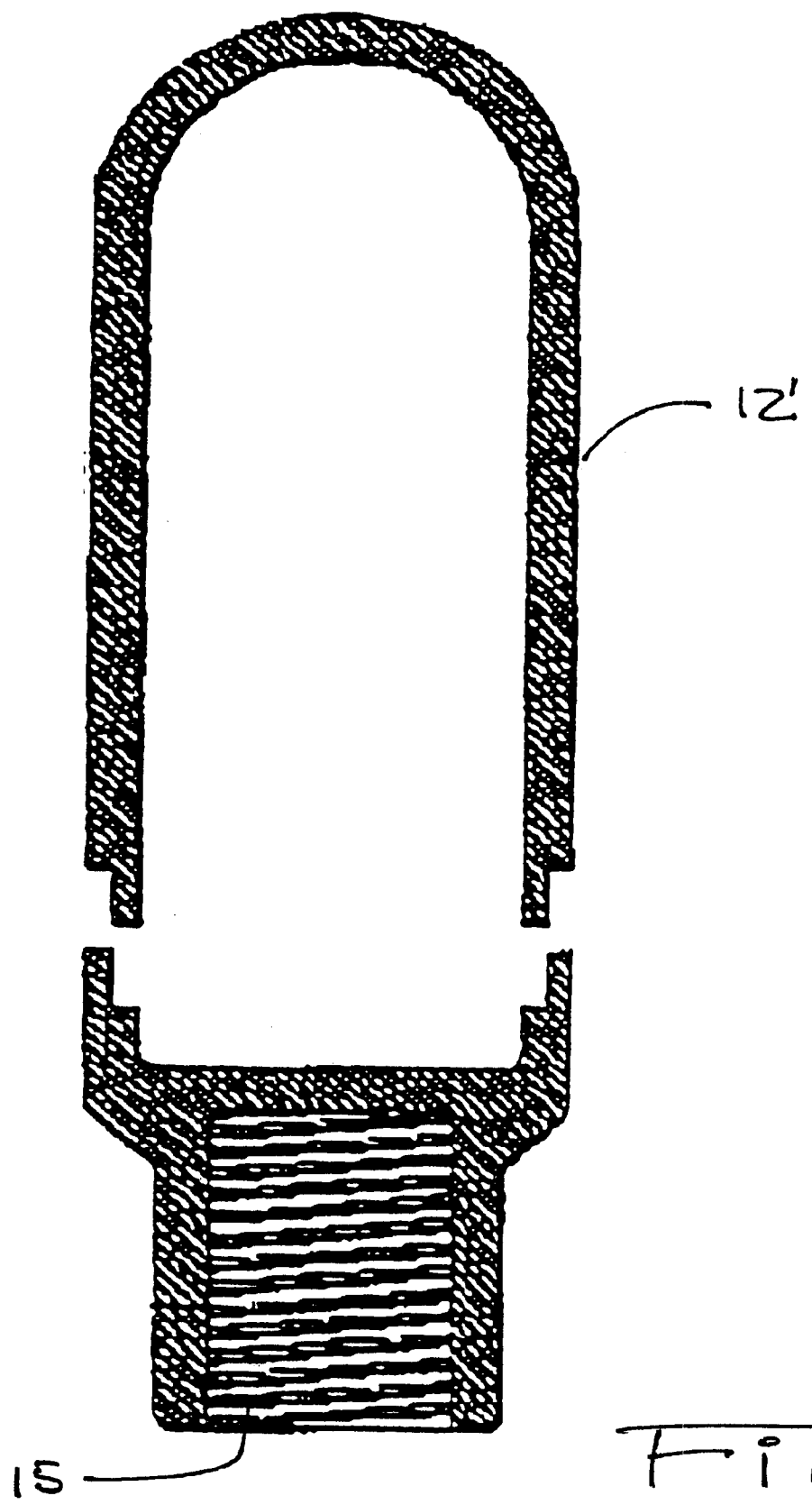
FIG. 5 is a cross sectional view of a housing for the wheel light of FIG. 4.
Figure 6:
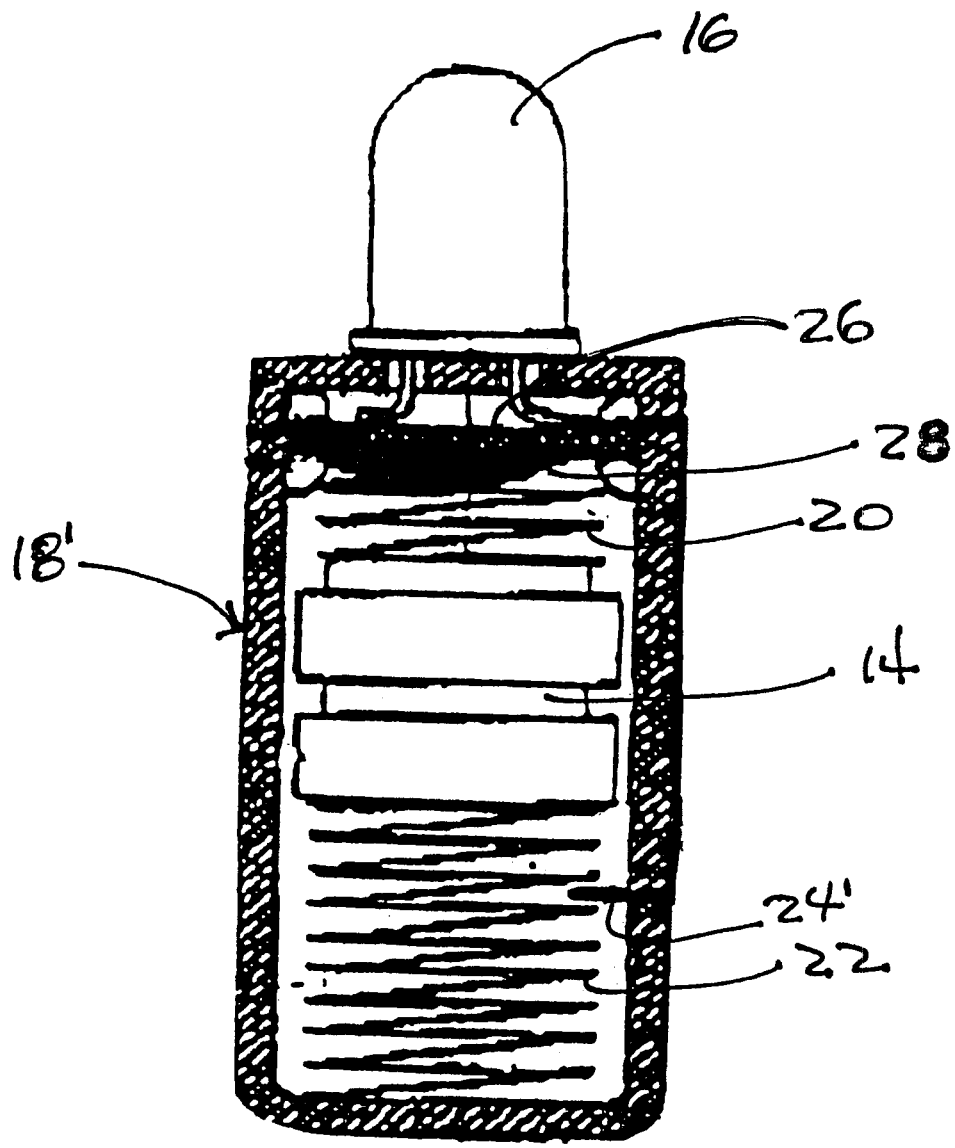
FIG. 6 is a view of the light source, power source and switch of the wheel light shown in FIG. 4.
Figure 7:
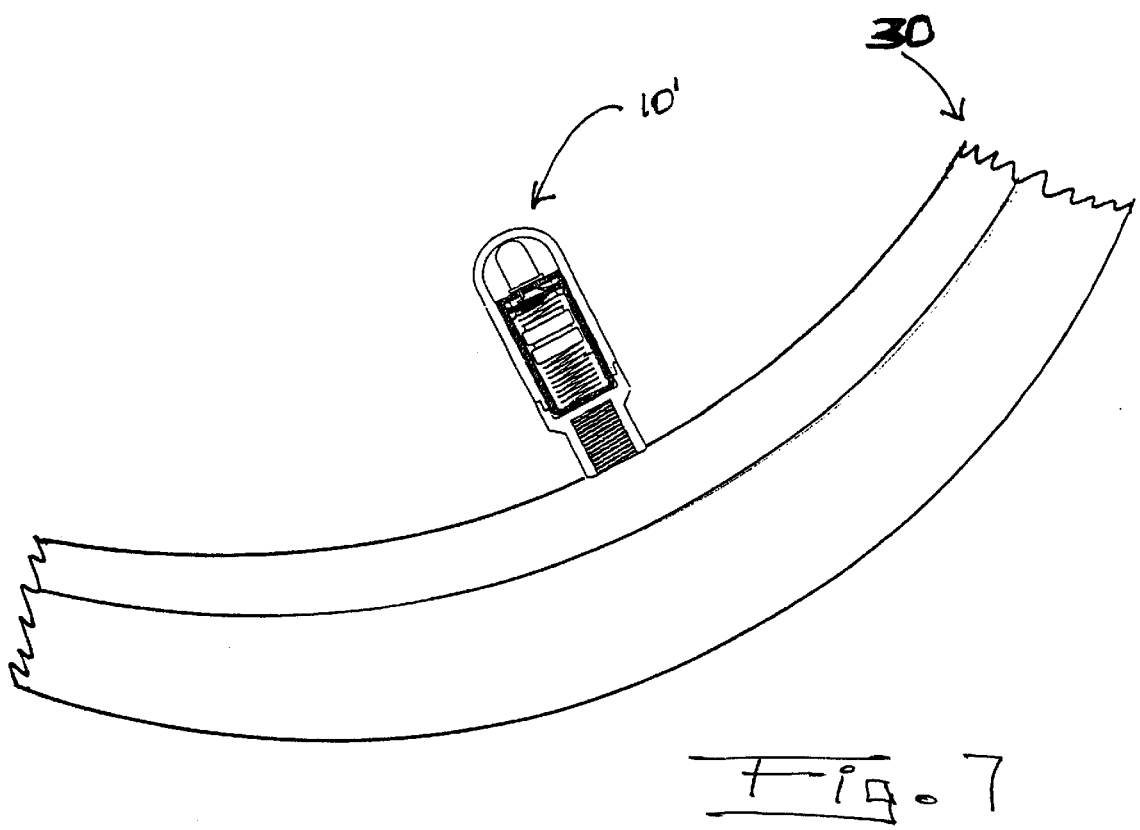
FIG. 7 shows the wheel light of FIG. 4 in place on a vehicle wheel.

FIGS. 1 through 7 illustrate the present invention, a motion activated wheel light 10 for a vehicle wheel 30 having an air valve stem. The wheel light 10 comprises a housing 12, a power source 14, a light source 16, and a motion activated switch 18 connected in a circuit together with the other electrical components. The housing 12, preferred embodiments of which are shown in FIGS. 2–5, serves to enclose the electrical components, including the light source 16 and power source 14. The housing 12 serves to connect the wheel light 10 to the air valve stem of a vehicle wheel 30, as shown in FIG. 7. The power source 14, at least one battery, but preferably two, is positioned within the housing 12 connected to an electrical circuit, as shown in FIGS. 1, 4 and 6. A light source 16, which those skilled in the art will know may be any suitable light, but preferably a light emitting diode, is positioned within the housing 12 and is connected to the power source 14 through the electrical circuit. A motion activated switch 18 is connected to the power source 14 and to the light source 16 through the electrical circuit so as to close the circuit and energize the light source 16 responsive to movement of the wheel 30, the movement being preferably rotational motion when the vehicle is moving.

The skilled artisan will know that vehicle wheels 30, particularly in modern vehicles having tubeless pneumatic tires, comprise air valves wherein the valve stem is connected directly to the wheel rim. Alternatively, in a vehicle whose tires include an inner tube, for example, in many bicycles, the air valve stem is part of the inner tube and protrudes from the wheel rim by fitting through an opening therein. The present invention is intended to connect to any such type of air valve stem, whether the pneumatic tire includes an inner tube or not.

The housing 12 for the wheel light 10, best shown in FIGS. 2–3 and 5, preferably comprises a translucent or transparent material so as to allow emitted light to shine through the housing 12. In addition, the housing 12 preferably is fabricated from ultrasonically sealed plastic material, thereby comprising a substantially waterproof enclosure for the other components of the wheel light 10. The housing 12 additionally comprises a connector to connect the wheel light 10 to the air valve stem of a vehicle wheel. As shown in FIGS. 3–5 and 7, the housing 12 preferably has threads 15 complementary to those found on a standard air valve stem and connects the wheel light 10 to the wheel 30 by screwing onto the valve stem. Alternatively, the housing 12 may connect to the valve stem substantially by a pressure coupling, or by other methods of connecting as known to those skilled in the art. As illustrated in FIG. 2, the housing 12 may be provided with striations to help scatter light emitted by the light source.

An aspect of the present invention includes the ability to form a visually perceptible image when the light source 16 is energized. For example, the light source 16 itself may comprise a shape which lights up as the wheel 30 is rotating to form the visually perceptible light image, or design. To enhance the light image, the wheel light 10 may be configured to emit light in one or more colors. The light source 16 itself may emit colored light, or the housing 12 may comprise material having one or more colors to thereby produce a visually perceptible image in color as the wheel 30 rotates. Particularly useful and aesthetic applications of this aspect of the invention include forming emblem images which appear perceptible to the eye as the vehicle begins to move. The image may advantageously form an advertisement which is displayed as the vehicle moves. Such an advertisement may include a team logo, for example, for a professional or school athletic team.

A preferred embodiment of the invention is shown in FIGS. 1–3. In this embodiment, the motion sensitive switch 18 comprises a switch contact 24 electrically connected to a pole of the power source 14. The switch contact 24 is positioned suspended adjacent a contact plate 32. Movement of the wheel light 10 causes the switch contact 24 to vibrate sufficiently to touch the contact plate 32, thereby closing the electrical circuit and energizing the light source 16. When movement of wheel light 10 ceases, vibration of the switch contact 24 is reduced and eventually stops, the switch contact moves away from the contact plate 32, and the electrical circuit is opened, turning off the light source 16.

In this embodiment the switch contact 24 is preferably a spring coil formed from a wire which is electrically connected to the lower pole of the power source, as shown in FIG. 1. The vibrational characteristics of switch contact 24 depend on factors known in the art, such as the gauge of wire used to make the spring coil, the number of coils in the spring, the tensile strength of the wire and, therefore, its bendability. Careful control of such characteristics will allow fabrication of a switch contact 24 of predetermined sensitivity to motion, and of predetermined residual contact after motion stops. An integrated circuit 28 positioned on circuit board 26 may also be configured for controlling the rate at which the light source 16 is energized. For example, the integrated circuit 28 can minimize the energizing of the light source 16 due to random movement such as experienced during shipment of the wheel light 10. Additionally, the integrated circuit 28 could be configured to provide a low power use mode responsive to random movement of the wheel light, thereby helping conserve energy in the power source.

In another embodiment of the wheel light 10', as shown in FIGS. 4–7, the wheel light includes a motion sensitive switch 18'connected to the power source 14 and to the light source 16 to thereby control power flow energizing the light source 16. As illustrated in FIG. 7, the switch 18' is motion activated, and more specifically, is responsive to a centrifugal force generated when the vehicle wheel 30 is moving in a rotational motion. Those skilled in the art will know how to construct a mechanism as shown in FIGS. 4 and 6, comprising a biasing member, preferably a spring, calibrated to respond to an applied force so as to close an electrical contact and energize the light source 16. An embodiment of the switch 18' shown in FIGS. 4 and 6 includes a first biasing member 20, a second biasing member 22, a switch contact 24', and a circuit board 26 having an integrated circuit 28. When the wheel light 10' is connected to an air valve stem, the applied force will be a centrifugal force generated when the wheel 30 rotates. This force will act on the wheel light 10' in a downward direction, the lower end of the wheel light being at that end of the housing 12' comprising the connector for the air valve stem, preferably threads 15 as shown in FIG. 7. The force moves the power source 14 toward the lower end of the housing, thereby also moving the biasing member to touch switch contact 24' to thereby close the electrical circuit and energize the light source.

Those skilled in the art will realize that the switch 18 preferably comprises a known integrated circuit providing functions related to controlling power flow to the light source 16. For example, the switch 18 may intermittently energize the light source 16 responsive to rotational motion of the vehicle wheel 30 to thereby create visual effects with the emitted light. In addition, intermittent energizing of the light source 16 may be accomplished at predetermined timed intervals to create further light effects. For example, wheel lights 10 having different predetermined energizing intervals could be connected to the four wheels of a car, so that each wheel 30 flashes at asynchronous times relative to the other wheels.

Another aspect of the present invention includes a method of lighting a vehicle wheel 30 having an air valve stem. The method comprises connecting a motion activated light source 16 to the air valve stem of the wheel 30, and moving the wheel 30 to activate the light source 16 to emit light. As described above, moving the wheel 30 preferably comprises a rotational motion, as when the vehicle is moving.

An additional method aspect of the invention includes forming a visually perceptible light image on a vehicle wheel 30 having an air valve stem by connecting a motion activated wheel light 10 to the air valve stem of the wheel 30, the wheel light comprising a predetermined shape so that when energized the light source 16 emits light forming the image; and moving the wheel 30 to activate the light source 16 to emit light for forming the image.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A motion activated light for a vehicle wheel having an air valve stem, said light comprising:

a connector complementary to the air valve stem for connecting said light thereto;

a power source connected in an electrical circuit;

a light source connected to said power source through the electrical circuit; and a switch connected to the electrical circuit, said switch responsive to movement of the wheel to thereby energize the light source.

2. The light of claim 1, wherein an inner tube comprises the air valve stem.

3. The light of claim 1, wherein the air valve stem has threads and the connector comprises complementary threads for connecting said light to the air valve stem.

4. The light of claim 1, wherein the connector comprises a pressure coupling for connecting to the air valve stem.

5. The light of claim 1, wherein said power source comprises a battery.

6. The light of claim 1, wherein said light source comprises a light emitting diode.

7. The light of claim 1, wherein said motion comprises a centrifugal force.

8. A motion activated light for a vehicle wheel having an air valve with a threaded stem, said light comprising:

a housing having threads complementary to the threaded stem for connecting said light to the air valve stem;

a power source connected to an electrical circuit;

a light emitting diode connected to the electrical circuit; and a switch connected to close the electrical circuit responsive to movement of the wheel so as to energize the light emitting diode.

9. The light of claim 8, wherein an inner tube comprises the air valve stem.

10. The light of claim 8, wherein said motion activated light comprises at least one color.

11. The light of claim 8, wherein said housing comprises a substantially waterproof enclosure.

12. The light of claim 8, wherein said housing further comprises an ornamental shape.

13. The light of claim 8, wherein said light emitting diode emits light of a predetermined color.

14. The light of claim 8, wherein said motion sensitive switch intermittently closes said electrical circuit responsive to movement to thereby cause said light emitting diode to emit flashes of light.

15. The light of claim 8, wherein said motion sensitive switch energizes said light source for a predetermined time following movement of the wheel.

16. A lighted wheel for a vehicle, comprising:

a pneumatic tire comprising an air valve having a stem; and a motion activated light connected to the air valve stem;

wherein the motion activated light comprises an electrical circuit having a power source, a light source, and a switch sensitive to motion of the wheel and connected to close the circuit to thereby energize the light source responsive to motion of the wheel.

17. The lighted wheel of claim 16, wherein the motion activated light further comprises a housing having a connector complementary to the air valve stem.

18. The lighted wheel of claim 16, wherein the motion activated light further comprises an ornamental shape.

19. The lighted wheel of claim 16, wherein said power source comprises at least one battery.

20. The lighted wheel of claim 16, wherein said light source comprises a light emitting diode.

21. The lighted wheel of claim 16, wherein said motion activated light comprises a color.

22. The lighted wheel of claim 16, wherein said motion sensitive switch intermittently energizes said light source responsive to motion to thereby cause said light source to emit flashes of light.

23. The lighted wheel of claim 16, wherein said motion sensitive switch energizes said light source for a predetermined time following movement of the wheel.

24. A method of lighting a vehicle wheel having an air valve stem, the method comprising:

connecting a light source to the air valve stem of the wheel, said light source activated by sufficient wheel motion; and emitting light by causing the wheel to move sufficiently to activate the light source.

25. The method of claim 24, wherein the air valve stem comprises threads, the motion activated light comprises complementary threads, and connecting comprises screwing the motion activated light onto the air valve stem.

26. The method of claim 24, wherein causing the wheel to move comprises driving a vehicle having the lighted wheel attached thereto.

27. The method of claim 24, wherein emitting light comprises emitting light having a predetermined color.

28. A method of forming a visually perceptible light image adjacent a rotating wheel on a moving vehicle, the wheel having an air valve stem, comprising:

connecting a light to the air valve stem of the wheel, the light capable of being activated by sufficient wheel rotation and comprising a predetermined shape for forming the light image; and causing the vehicle to move so as to impart sufficient rotation to the wheel to activate the light source to emit light, thereby forming the visually perceptible light image.

29. The method of claim 28, wherein the motion activated light comprises an electrical circuit having a power source, a light source, and a motion sensitive switch connected to close the circuit to thereby energize the light source responsive to motion of the wheel.

30. The method of claim 28, wherein the wheel comprises an inner tube having the air valve stem.

31. The method of claim 28, wherein the motion activated light comprises a light emitting diode.

32. The method of claim 28, further comprising emitting light having a color.

* * * * *